United States Patent [19]

Okamoto et al.

[11] Patent Number: 5,085,807
[45] Date of Patent: Feb. 4, 1992

[54] FLAME-RETARDANT LIQUID CRYSTAL POLYESTER COMPOSITION, PROCESS FOR PREPARATION THEREOF AND INJECTION-MOLDED ARTICLE COMPOSED THEREOF

[75] Inventors: Masaru Okamoto, Tokai; Yasunori Ichikawa, Nagoya; Toshihide Inoue, Ichinomiya; Toru Yamanaka, Nagoya, all of Japan

[73] Assignee: Toray Industries, Inc., Japan

[21] Appl. No.: 523,030

[22] Filed: May 14, 1990

[30] Foreign Application Priority Data

| May 15, 1989 [JP] | Japan | 1-122050 |
|---|---|---|
| Dec. 12, 1989 [JP] | Japan | 1-323380 |
| Jan. 5, 1990 [JP] | Japan | 2-000856 |

[51] Int. Cl.$^5$ .............................................. C09K 21/00
[52] U.S. Cl. .................................... 252/609; 252/601; 252/602; 252/604; 252/299.5; 428/1
[58] Field of Search .................. 252/299.5, 601, 609, 252/610, 604, 602; 428/1

[56] References Cited

U.S. PATENT DOCUMENTS

| 3,778,410 | 12/1973 | Kuhfuss | 260/47 C |
|---|---|---|---|
| 3,912,792 | 10/1975 | Touval et al. | 252/601 |
| 4,530,880 | 7/1985 | Taniuchi et al. | 252/609 X |
| 4,728,463 | 3/1988 | Sutker et al. | 252/609 |
| 4,741,864 | 5/1988 | Auakian et al. | 252/609 |
| 4,832,873 | 5/1989 | Faustritsky et al. | 252/601 |
| 4,861,515 | 8/1989 | Minamisawa et al. | 252/299.01 |
| 4,874,800 | 10/1989 | Minamisawa et al. | 523/205 |
| 4,888,127 | 12/1989 | Wada et al. | 252/299.5 |
| 4,904,752 | 2/1990 | Kanoe et al. | 428/1 X |
| 4,943,606 | 7/1990 | Inoue et al. | 523/457 |
| 4,950,360 | 8/1990 | Murao et al. | 156/668 |

FOREIGN PATENT DOCUMENTS 63-139715 6/1988 Japan.
1-118567 5/1989 Japan.

Primary Examiner—Richard D. Lovering
Assistant Examiner—Nina Bhat
Attorney, Agent, or Firm—Austin R. Miller

[57] ABSTRACT

Disclosed is a flame-retardant liquid crystal polyester composition, which comprises (A) 100 wt. parts of a liquid crystal polyester comprising structural units of the following formulae (I), (II), (III) and (IV), in which the amount of units (I) and (II) is 77 to 95 mole% based on the sum of units (I), (II) and (III), the amount of units (III) is 23 to 5 mole% based on the sum of units (I), (II) and (III), and the units (I)/units (II) molar ratio is 75/25-95/5 and (B) 0.5 to 30 wt. parts of a polymeric flame retardant having an average dispersed particle diameter not larger than 2.5 μm:

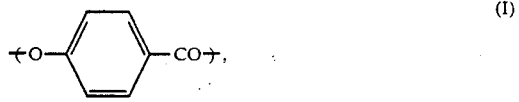

(I)

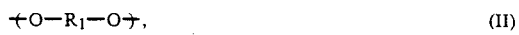

(II)

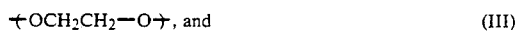

and (III)

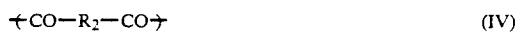

(IV)

wherein $R_1$ and $R_2$ are specific aromatic residues.

This composition gives a molded article having a superior flame retardancy, heat resistance, mechanical properties, and appearance.

26 Claims, No Drawings

FLAME-RETARDANT LIQUID CRYSTAL POLYESTER COMPOSITION, PROCESS FOR PREPARATION THEREOF AND INJECTION-MOLDED ARTICLE COMPOSED THEREOF

BACKGROUND OF THE INVENTION (1) Field of the Invention

The present invention relates to a flame-retardant liquid crystal polyester composition having superior flame retardancy, especially high resistance to fall out of granules during of combustion, and providing a shaped article having good heat resistance, mechanical properties, and appearance.

(2) Description of the Prior Art

The demand for an enhancement of the performance of plastics has increased, and many polymers having good performances have been developed and marketed. Among these polymers, optically anisotropic liquid crystal polymers characterized by a parallel configuration of molecule chains have attracted attention, due to their superior flowability and mechanical properties, and the application of these polymers as machine parts, electric and electronic parts, and the like is widening.

In addition to a balance among general chemical and physical properties, a high degree of safety against a flame, i.e., a high flame retardancy, is urgently required for these industrial materials.

It is known, in general, that a liquid crystal polymer has good combustion resistance and when the polymer is directly exposed to a flame, foaming spontaneously occurs and a carbonized layer is formed.

Nevertheless, it was found that since a liquid crystal polyester formed by copolymerizing a polyester derived from an alkylene glycol and a dicarboxylic acid with an acyloxy aromatic carboxylic acid (for example, a polymer disclosed in Japanese Examined Patent Publication No. 56-18016) contains an aliphatic component, and thus the flame retardancy of a thin (1/32") shaped article of this polymer is poor, as compared with the flame retardancy of a wholly aromatic polyester (for example, Vectra A-130 supplied by Polyplastics Co. Ltd.).

Accordingly, the inventors incorporated various flame retardants in the polymer disclosed in Japanese Examined Patent Publication No. 56-18016, and found that, although the flame retardancy of a thin shaped article having a thickness of e.g. 1/32 inch is improved, a shaped article having good heat resistance, mechanical properties, and appearance cannot be obtained.

SUMMARY OF THE INVENTION

Therefore, the primary object of the present invention is to provide a flame-retardant liquid crystal polyester composition having superior flame retardancy, heat resistance, and mechanical properties, and giving a shaped article having a good appearance.

In accordance with the present invention, there is provided a flame-retardant liquid crystal polyester composition which comprises (A) 100 parts by weight of a liquid crystal polyester comprising structural units represented by the following formulae (I), (II), (III) and (IV), in which the amount of structural units (I) and (II) is 77 to 95% by mole based on structural units (I), (II) and (III), the amount of structural units (III) is 23 to 5% by mole based on structural units (I), (II) and (III), and the structural units (I)/structural units (II) molar ratio is from 75/25 to 95/5, (B) 0.5 to 30 parts by weight of a polymeric flame retardant having an average dispersed particle diameter not larger than 2.5 μm, and optionally, (C) up to 200 parts by weight, per 100 parts by weight of the sum of the liquid polyester (A) and polymeric flame retardant (B), of a filler, wherein the aforementioned formulae are:

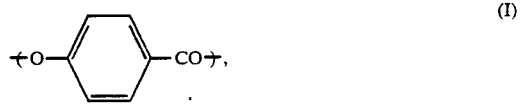 (I)

 (II)

 (III)

 (IV)

wherein $R_1$ represents at least one group selected from the group consisting of

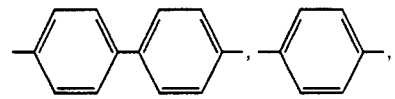

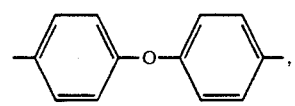

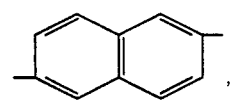

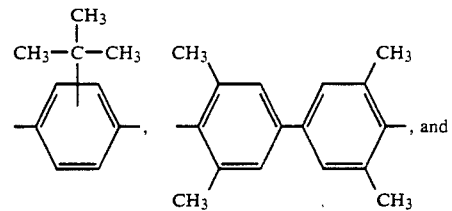, and

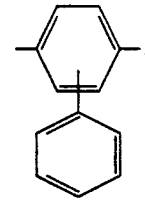

and $R_2$ represents at least one group selected from the group consisting of

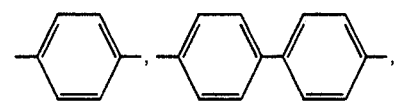

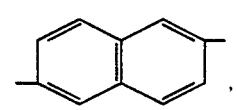

-continued

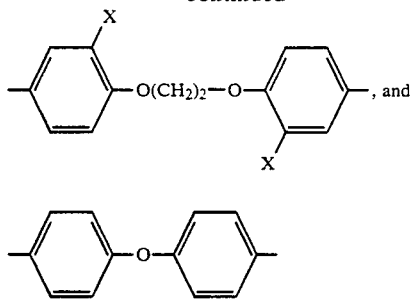, and in which X represents a hydrogen atom or a chlorine atom, and the amount of structural units (IV) is substantially equimolar to the amount of structural units (II) and (III).

DESCRIPTION OF THE PREFERRED EMBODIMENTS

The present invention will now be described in detail.

In the liquid crystal polyester (A) used in the flame-retardant liquid crystal polyester composition of the present invention, the structural units (I) are those formed from p-hydroxybenzoic acid, the structural units (II) are those derived from an aromatic diol such as 4,4'-dihydroxybiphenyl, hydroquinone, 4,4'-dihydroxydiphenyl ether, 2,6-dihydroxynaphthalene, t-butylhydroquinone, 3,3',5,5'-tetramethyl-4,4'-dihydroxybiphenyl or phenylhydroquinone, the structural units (III) are those derived from ethylene glycol, and the structural units (IV) are those derived from an aromatic carboxylic acid such as terephthalic acid, 4,4'-diphenyldicarboxylic acid, 2,6-naphthalenedicarboxylic acid, 1,2-bis(phenoxy)ethane-4,4'-dicarboxylic acid, 1,2-bis(2-chlorophenoxy)ethane-4,4'-dicarboxylic acid or 4,4'-diphenylether-dicarboxylic acid. In these structural units, $R_1$ comprises preferably at least 70 mole % of

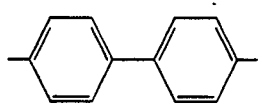

and $R_2$ comprises preferably at least 70 mole % of

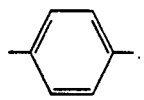

Especially preferably $R_1$ is composed solely of

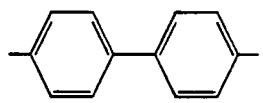

and $R_2$ is composed solely of

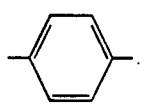

To further improve the mechanical anisotropy of the shaped article, preferably at least two compounds are used for $R_1$ and at least two compounds are used for $R_2$.

In the liquid crystal polyester (A) comprising the structural units (I), (II), (III) and (IV), the amount of structural units (I) and (II) is 77 to 95 mole %, preferably 80 to 93 mole %, and more preferably 85 to 90 mole %, based on the amount of structural units (I), (II) and (III). Furthermore, the amount of structural units (III) is 23 to 5 mole %, preferably 20 to 7 mole %, and more preferably 15 to 10 mole %, based on the amount of structural units (I), (II) and (III). If the amount of structural units (I) and (II) is larger than 95 mole % based on the amount of structural units of (I), (II) and (III), the melt flowability is reduced and solidification occurs during the polymerization, and if this amount is smaller than 77 mole %, the heat resistance is lowered.

The structural units (I)/structural units (II) molar ratio is from 75/25 to 95/5, preferably from 78/22 to 93/7, and more preferably from 91/9 to 93/7. If this molar ratio is lower than 75/25 or higher than 95/5, the heat resistance and flowability are lowered or the mechanical anisotropy becomes too high.

The amount of structural units (IV) must be substantially equimolar to the amount of structural units (II) and (III).

The following processes can be mentioned as the typical process for the preparation of the liquid crystal polyester used in the present invention, and the process (2) is most preferably adopted.

(1) A process comprising subjecting p-acetoxybenzoic acid, a diacylation product of an aromatic dihydroxy compound such as 4,4'-diacetoxybiphenyl, an aromatic dicarboxylic acid such as terephthalic acid, and at least one compound selected from polyesters and oligomers derived from ethylene glycol and an aromatic dicarboxylic acid, and bis($\beta$-hydroxyethyl) esters of aromatic dicarboxylic acids to a polymerization involving removal of acetic acid.

(2) A process comprising reacting p-hydroxybenzoic acid, an aromatic dihydroxy compound such as 4,4'-dihydroxybiphenyl, an aromatic dicarboxylic acid such as terephthalic acid, and at least one compound selected from polyesters and oligomers derived from ethylene glycol and an aromatic dicarboxylic acid, and bis($\beta$-hydroxyethyl) esters of aromatic dicarboxylic acid, with acetic anhydride, and subjecting the reaction mixture to a polymerization involving removal of acetic acid.

In the process (2), the polymerization is preferably carried out by the melt polymerization method, the solid phase polymerization method or the method in which the polymerization product becomes a multi-dispersed solid during the polymerization, is not preferred.

The above-mentioned polycondensation reaction advances even in the absence of a catalyst, but better results are occasionally obtained if a metal compound such as stannous acetate, tetrabutyl titanate, sodium acetate, potassium acetate or metallic magnesium is added.

The melting point (Tm, °C.) of the liquid polyester (A) used in the present invention is preferably 230° to 350° C. and more preferably 250° to 330° C.

Of the liquid crystal polyesters (A) used in the present invention, liquid crystal polyesters in which $R_1$ in structural units (II) comprises at least 70% by mole of

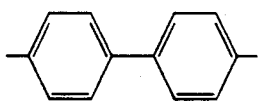

and $R_2$ in structural units (IV) comprises at least 70% by mole of

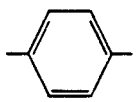

have preferably a melting point (Tm, °C.) satisfying the requirement defined by the following formula (1):

$$-10 < (Tm + 5.89X - 385.5) < 10 \quad (1)$$

wherein X represents the ratio (% by mole) of structural units (III) to the sum of structural units (I), (II) and (III).

Even if the composition of structural units (I) through (IV) satisfies all of the foregoing conditions, sometimes the melting point of the polymer fails to satisfy the requirement of the above-mentioned formula (1), because of the differences of the composition distribution and randomness of the polymer. In this case, the flowability of the polymer and the heat resistance and mechanical properties of the shaped article are lowered, and at high temperatures, the polymer is easily decomposed and the loss by heating increases. Therefore, the use of a polyester satisfying the requirement of formula (1) is preferable.

The melting point (Tm) referred to herein means the endothermic peak temperature observed when the measurement is carried out at a temperature-elevating rate of 20° C./min by using a differential scanning calorimeter, i.e., $Tm_2$ described hereinafter.

For this differential scanning calorimetric measurement, a polymer in which the polymerization has been completed is heated from room temperature to a temperature exceeding the melting point, at a temperature-elevating rate of 20° C./min and the observed endothermic peak temperature (hereinafter referred to as "$Tm_1$") is measured. After the measuring of $Tm_1$, the polymer is maintained at a temperature of ($Tm_1 + 20°$ C.) for 5 minutes, the polymer is once cooled to room temperature at a temperature-dropping rate of 20° C./min, and the temperature is then elevated at a rate of 20° C./min. The endothermic peak temperature (hereinafter referred to as "$Tm_2$") measured at this second run is measured. Preferably, the requirement of $|Tm_1 - Tm_2| \leq 10°$ C., especially $|Tm_1 - Tm_2| \leq 6°$ C., is satisfied. If this temperature difference exceeds 10° C., the randomness of the polymer is not satisfactory.

The logarithmic viscosity of the liquid crystal polyester, as measured in pentafluorophenol at 60° C. at a concentration of 0.1 g/dl, is preferably 1.0 to 3.0 dl/g, and more preferably 1.3 to 2.5 dl/g. If the logarithmic viscosity is lower than 1.0 dl/g, the mechanical properties are not satisfactory, and if the logarithmic viscosity is higher than 3.0 dl/g, the flowability is lowered.

The melt viscosity of the liquid crystal polyester (A) used in the present invention is preferably 100 to 20,000 poise and more preferably 200 to 7,000 poise. The melt viscosity referred to herein is a value measured at a temperature of [melting point ($Tm_2$) + 10° C.] and a shear rate of 1,000 sec$^{-1}$ by using a Koka type flow tester.

When preparing the liquid crystal polyester (A) used in the present invention by polycondensation, minor amounts of comonomers can be copolymerized with the components constituting structural units (I) through (IV), as long as the attainment of the objects of the present invention is not hindered. As the comonomer, there can be mentioned aromatic dicarboxylic acids such as isophthalic acid, 3,3'-diphenyldicarboxylic acid, and 2,2'-diphenyldicarboxylic acid, aliphatic dicarboxylic acids such as adipic acid, azelaic acid, sebacic acid, and dodecanedioic acid, alicyclic dicarboxylic acids such as hexahydroterephthalic acid, aromatic diols such as chlorohydroquinone, methylhydroquinone, 4,4'-dihydroxydiphenylsulfone, 4,4'-dihydroxydiphenylpropane, 4,4'-dihydroxydiphenyl sulfide, and 4,4'-dihydroxybenzophenone, aliphatic and alicyclic diols such as 1,4-butanediol, 1,6-hexanediol, neopentyl glycol, 1,4-cyclohexanediol, and 1,4-cyclohexanedimethanol, ethylene oxide adducts of aromatic diols such as an ethylene oxide adduct of bisphenol A, aromatic hydroxycarboxylic acids such as m-hydroxybenzoic acid and 2,6-hydroxynaphthoic acid, ethylene oxide adducts of aromatic hydroxycarboxylic acids such as β-hydroxyethoxybenzoic acid, and aromatic imide compounds (imides of aromatic dicarboxylic acids, hydroxycarboxylic acids and dihydroxy compounds having an imide linkage in the molecule).

A polymeric organic bromine compound having a bromine atom in the molecule and/or a polymeric organic phosphorus compound having a phosphorus atom in the molecule is preferably used as the polymeric flame retardant (B) in the present invention.

A polymeric organic bromine compound having a bromine content of at least 20% by weight is more preferably used as the polymeric organic bromine compound. More specifically, there can be mentioned brominated polycarbonates (for example, a polycarbonate oligomer prepared by using brominated bisphenol A and a copolymer thereof with bisphenol A), brominated epoxy compounds (for example, an epoxy compound prepared by reaction between brominated bisphenol A and epichlorohydrin and a monoepoxy compound obtained by reaction between a brominated phenol and epichlorohydrin), halogenated polymers and oligomers such as poly(brominated benzyl acrylate), brominated polyphenylene ether, a brominated bisphenol A/cyanuric chloride/brominated phenol condensate, brominated polystyrene, crosslinked brominated polystyrene, and crosslinked brominated poly-α-methylstyrene, and mixtures thereof. Among the above, a brominated epoxy oligomer or polymer, brominated polystyrene, crosslinked brominated polystyrene, brominated polyphenylene ether, and brominated polycarbonate are preferably used, and brominated polystyrene is most preferably used.

As the brominated polystyrene, a polymer comprising at least 70% by mole of recurring units represented by the following formula (2) is preferably used:

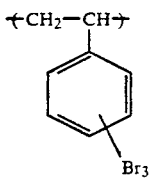 (2)

The weight average molecular weight of the brominated polystyrene is preferably $15 \times 10^4$ to $100 \times 10^4$, more preferably $20 \times 10^4$ to $100 \times 10^4$, and most preferably $30 \times 10^4$ to $100 \times 10^4$. The weight average molecular weight referred to herein is the relative value measured by using a gel permeation chromatograph and calculated based on the molecular weight of polystyrene.

If the weight average molecular weight is lower than $15 \times 10^4$, the mechanical characteristics tend to decrease during the melt shaping operation, and if the weight average molecular weight is higher than $100 \times 10^4$, the flowability of the composition of the present invention tends to be reduced. Accordingly, too low a weight average molecular weight or too high a weight average molecular weight is not preferable.

This brominated polystyrene is prepared by brominating polystyrene obtained by radical polymerization or anion polymerization.

The polymeric organic bromine compound is incorporated in an amount of 0.5 to 30 parts by weight, preferably 1 to 20 parts by weight, per 100 parts by weight of the liquid crystal polyester. Since the flame retardancy has a close relationship with the copolymerization amount of structural units (III) in the liquid crystal polyester, the amount of the polymeric organic bromine compound added is preferably adjusted in the following manner. Namely, the organic bromine compound is preferably incorporated in an amount of 0.5 y to 1.5 y parts by weight, more preferably 0.8 y to 1.2 y parts by weight, as the bromine atom per 100 parts by weight of the liquid crystal polyester.

The value "y" referred to herein indicates the amount (parts by weight) of the bromine atom per 100 parts by weight of the liquid crystal polyester of the present invention, which is defined by the following empirical formula (a):

$$y = 0.34X \quad (a)$$

wherein X represents the amount (% by mole) of structural units (III) based on the sum of structural units (I), (II) and (III).

The amount added of brominated polystyrene (bromine content=68% by weight), one of preferred bromine compounds, is (0.25X to 0.75X) parts by weight, preferably (0.4X to 0.6X) parts by weight, per 100 parts by weight of the liquid crystal polyester.

Accordingly, the brominated polystyrene is preferably added to 100 parts by weight of the liquid crystal polyester of the present invention (X=23 to 5% by mole), in an amount of from (3.75 to 1.25) to (17.25 to 5.75) parts by weight, more preferably from (3 to 2) to (13.8 to 9.2) parts by weight. The brominated polystyrene is preferably added to 100 parts by weight of the preferable liquid crystal polyester (X=20 to 7% by mole), in an amount of from (5.25 to 1.75) to (15 to 5) parts by weight, more preferably from (4.2 to 2.8) to (12.0 to 8.0) parts by weight. To 100 parts by weight to the most preferable liquid crystal polyester (X=15 to 10% by mole), the brominated polystyrene is preferably added in an amount of from (7.5 to 2.5) to (11.5 to 3.75) parts by weight, more preferably from (6 to 4) to (9 to 6) parts by weight.

As the polymeric organic phosphorus compound, polymers having the following structural units can be used:

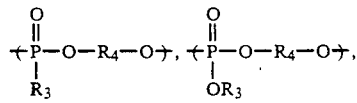

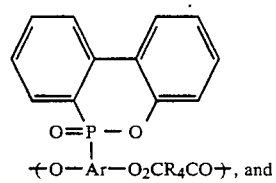

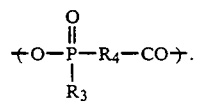

In the above formulae, $R_3$ represents an alkyl group having 1 to 12 carbon atoms or an aryl group having 6 to 12 carbon atoms and $R_4$ represents an alkylene group having 1 to 15 carbon atoms, a cycloalkylene group having 3 to 15 carbon atoms or an arylene group having 6 to 15 carbon atoms.

A polymer having the following structural units is especially preferably used as the polymeric organic phosphorus compound:

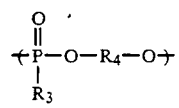

wherein $R_3$ and $R_4$ are as defined above.

These organic phosphorus compounds may be partially in the form of metal salts.

The amount of the organic phosphorus compound added is preferably 0.5 to 30 parts by weight, more preferably 0.5 to 15 parts by weight, per 100 parts by weight of the liquid crystal polyester (A), and preferably 2 to 150 parts by weight, more preferably 10 to 110 parts by weight, per 100 parts by weight of structural units (III).

An organic phosphorus compound containing a bromine atom, for example, a polymer having the following structural units:

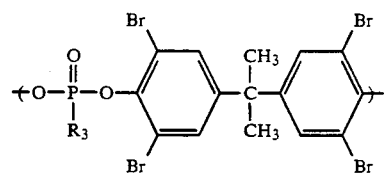

wherein $R_3$ is as defined above, can be used as the organic phosphorus compound in the present invention.

In the liquid crystal polyester of the present invention, the amount of structural units (III) is 5 to 23% by mole based on the sum of structural units (I), (II) and (III). Accordingly, even if the amount of the polymeric flame retardant added is within the above-mentioned range, at the vertical combustion test of UL-94 Standard (ASTM D-790), V-0 can be attained at a thickness of 1/32". If the amount of structural units (III) is smaller than 5% by mole, since the melting point of the liquid crystal polymer is elevated, the liquid crystal polyester is degraded by the flame retardant at the melting step to reduce the degree of polymerization, and even if a filler is added, the mechanical properties become poor and dripping occurs in the shaped article at the time of combustion. If the amount of structural units (III) is larger than 23% by mole the heat resistance such as the deflection temperature under load is drastically lowered, and to impart a satisfactory flame retardancy, a large quantity of the organic bromine compound or organic phosphorus compound must be added. The organic bromine compound or organic phosphorus compound is not as sufficiently dispersed in the liquid crystal polyester as in an isotopic polymer such as polyethylene terephthalate, and therefore, if the organic bromine compound or organic phosphorus compound is incorporated in a large amount, the dispersion becomes insufficient and it is difficult to control the dispersed particle diameter below 2.5 $\mu$m. Accordingly, a reduction of the mechanical properties and heat resistance often occurs. Furthermore, since a flame retardant assistant such as an antimony compound must be added in this case, the mechanical properties are drastically lowered.

Brominated polystyrene is especially preferably used as the polymeric flame retardant (B) in the present invention.

Namely, in accordance with a most preferred embodiment of the present invention, there is provided a composition comprising 100 parts by weight of a liquid crystal polyester in which an amount of structural units (III) is 10 to 15% by mole based on the sum of structural units (I), (II) and (III), and 4 to 9 parts by weight of brominated polystyrene.

In the present invention, the filler (C) is incorporated into the liquid crystal polyester composition of the present invention according to need. The amount of the filler (C) is up to 200 parts by weight, preferably 1 to 200 parts by weight, per 100 parts by weight of the sum of the liquid crystal polyester (A) and polymeric flame retardant (B). To reduce the anisotropic property of the shaped article prepared from this composition, or to control dripping at the time of combustion, the filler is preferably added in an amount of 15 to 100 parts by weight.

As the inorganic filler (C) used in the present invention, there can be mentioned fibrous, powdery, granular and plate-shaped inorganic fillers such as a glass fiber, a carbon fiber, an aromatic polyamide fiber, a potassium titanate fiber, a gypsum fiber, a brass fiber, a stainless steel fiber, a steel fiber, a ceramic fiber, a boron whisker fiber, mica, talc, silica, calcium carbonate, a glass bead, a glass flake, a glass microballoon, clay, wollastonite, and titanium oxide.

Among these fillers, a glass fiber is most preferably used. Any glass fibers customarily used for reinforcing resins can be used without limitation. For example, long filaments, or short filaments such as a chopped strand, or a milled fiber can be used. The average filament diameter of the glass fiber is preferably 4 to 15 $\mu$m and more preferably 4 to 11 $\mu$m, and to improve the anisotropic characteristics of the shaped article and improve the surface appearance and flowability, a glass fiber having a filament diameter of 4 to 8 $\mu$m is particularly preferably used as the filler.

The glass fiber can be covered with or gathered by a thermoplastic resin such as an ethylene/vinyl acetate copolymer or a thermosetting resin such as an epoxy resin. Furthermore, the glass fiber can be treated with a silane coupling agent, a titanate coupling agent or other surface-treating agent.

If at least one member selected from epoxy compounds and epoxysilane compounds is added to the flame-retardant liquid crystal polyester composition of the present invention, the hydrolysis resistance and long-time aging property can be improved, and furthermore, the affinity between the liquid polyester (A) and polymeric flame retardant (B) is increased and the anisotropic characteristic is further improved. The kind of the epoxy compound that can be used in the present invention is not particularly critical. For example, there can be used glycidyl ethers synthesized from a phenol and epichlorohydrin, such as bisphenol A diglycidyl ether and o-phenylphenol glycidyl ether, glycidyl esters such as diglycidyl hexahydrophthalate, diglycidyl tetrahydrophthalate, diglycidyl terephthalate, diglycidyl isophthalate, and glycidyl methacrylate, glycidyl ester ethers composed of a hydroxycarboxylic acid and epichlorohydrin, such as a glycidyl ester ether of p-hydroxybenzoic acid, epoxidized imide compounds such as N-glycidyl phthalamide, epoxidized polybutadiene, and epoxy group-containing copolymers of an epoxy group-containing unsaturated monomer such as glycidyl methacrylate with other unsaturated monomer such as ethylene.

Epoxysilane compounds customarily used as the coupling agent, such as $\gamma$-glycidoxypropyltrimethoxysilane, $\gamma$-glycidoxypropylmethyldimethoxysilane, and 2-(3,4-epoxycyclohexyl)ethyltrimethoxysilane are preferably used as the epoxysilane compound.

The epoxy compound or epoxysilane compound is preferably added in an amount of 0.01 to 20 parts by weight, more preferably 0.05 to 10 parts by weight, and most preferably 0.2 to 5 parts by weight, per 100 parts by weight of the liquid crystal polyester (A). If the amount of the epoxy compound or epoxysilane compound is smaller than 0.01 part by weight, the improvement of the hydrolysis resistance is not satisfactory, and if the amount of the epoxy compound or epoxysilane compound is larger than 20 parts by weight, the mechanical properties of the liquid polyester resin are lowered.

Usual additives and other thermoplastic resins can be added to the composition of the present invention for imparting particular characteristics thereto, as long as attainment of the objects of the present invention is not hindered. For example, there can be mentioned antioxidants and heat stabilizers such as hindered phenols, hydroquinones, phosphites and substitution products thereof, ultraviolet absorbers such as resorcinol, salicylates, benzotriazole and benzophenone, lubricants and release agents such as montanic acid, salts thereof, esters thereof, half-esters thereof, stearyl alcohol, stearamide and polyethylene wax, colorants including dyes such as Nigrosines and pigments such as cadmium sulfide, phthalocyanine and carbon black, plasticizers and antistatic agents.

The flame-retardant liquid crystal polyester composition of the present invention is preferably prepared by melt-mixing the foregoing components by using an extruder. The polymeric flame retardant (B) must be dispersed with an average dispersed particle diameter not larger than 2.5 μm, preferably not larger than 2.0 μm, and more preferably not larger than 1.5 μm. The lower limit of the average dispersed particle diameter is not particularly critical, and preferably the particles of the polymeric flame retardant (B) are dispersed as finely as possible. Nevertheless, it is practically difficult to prepare a composition wherein the average dispersed particle diameter of the polymeric flame retardant (B) is smaller than 0.1 μm, and accordingly, the lower limit of the average dispersed particle diameter is practically 0.1 μm.

If the average dispersed particle diameter is larger than 2.5 μm, the flame retardancy is not satisfactory, or the mechanical characteristics are not satisfactory, and therefore, the objects of the present invention cannot be attained. The average dispersed particle diameter can be determined by observing the diameters of all particles in the visual field by a scanning electron microscope, or transmission electron microscope and calculating the number average value of the measured diameters. In the case of particles not having a spherical shape, the average value of long and short diameters is determined.

To attain the above-mentioned average dispersed particle diameter, preferably a specific bulk density is given to the polymeric flame retardant or the polymeric flame retardant is pulverized to a specific particle diameter. For example, in the case of brominated polystyrene, the bulk density is at least 0.6 g/ml, preferably 0.6 to 0.7 g/ml, and the brominated polystyrene is pulverized so that the average particle diameter is not larger than 15 μm, preferably 5 to 12 μm. This feature is especially advantageous when the filler is incorporated, because the dispersibility of the polymeric flame retardant becomes poor by the incorporation of the filler.

As seen from the foregoing description, in the liquid crystal polyester composition of the present invention comprising the liquid crystal polyester and the polymeric flame retardant, the use of a polymeric flame retardant having a specific shape as mentioned above is preferable, especially when the filler is further incorporated. It is considered that this effect is due to the particular properties of the liquid crystal polyester, and this effect cannot be expected from the common knowledge of isotropic polyesters such as polyethylene terephthalate.

Any extruders customarily used for melt-mixing resins can be used for the preparation of the composition of the present invention, but a twin-screw extruder is most suitable for adjusting the average dispersed particle diameter of the polymeric flame retardant (B) to not larger than 2.5 μm.

As the preparation process suitable for adjusting the average dispersed particle diameter of the polymeric flame retardant to not larger than 2.5 μm, there can be mentioned a process comprising melt-kneading the liquid crystal polyester (A) together with the polymeric flame retardant (B) and adding the filler (C) to the kneaded mixture, and a process comprising melt-kneading a part of the liquid crystal polyester (A) together with the polymeric flame retardant (B) to form a composition having a high concentration of the polymeric flame retardant and melt-kneading the remaining liquid crystal polyester with this composition. In the latter process, if an incorporation of the filler (C) is desired, the filler (C) is preferably added to the composition having a high polymeric flame retardant concentration.

The flame retardant liquid crystal polyester composition of the present invention can be formed into a three-dimensional shaped article, a rod, tube, a sheet, and the like by injection molding, extrusion molding or blow molding; an injection-molded article being most preferable, although the shaped article is not limited to an injection-molded article.

When the filler (C) is not incorporated, the injection-molded article preferably has a heat distortion temperature (HDT, °C.) determined according to ASTM D-648, and which satisfies the requirement represented by the following formula (2), especially the following formula (2'):

$$-20 < ([HDT] - 323 + 6.8X) < 20 \quad (2)$$

$$-10 < ([HDT] - 323 + 6.8X) < 10 \quad (2')$$

wherein X represents the ratio (mole %) of structural units (III) to the sum of structural units (I), (II) and (III).

When the injection-molded article contains the filler (C), the heat distortion temperature (HDT, °C.) determined according to ASTM D-648 preferably satisfies the requirement represented by the following formula (3), especially the following formula (3'):

$$-20 < ([HDT] - Z + 6.8X - 85) < 20 \quad (3)$$

$$-10 < ([HDT] - Z + 6.8X - 85) < 10 \quad (3')$$

wherein X represents the ratio (mole %) of structural units (III) to the sum of structural units (I), (II) and (III), and Z is a value defined by the following formula (4):

$$Z = -\frac{1}{90} y^2 + \frac{29}{30} y + 238 \quad (4)$$

in which y represents the ratio (% by weight) of the filler (C) in the composition to the sum of the filler (C) and the liquid crystal polyester (A).

The injection-molded article of the present invention has a superior flame retardancy, heat resistance, processability, mechanical properties, and appearance.

The present invention will now be described in detail with reference to the following examples, that by no means limit the scope of the invention.

REFERENTIAL EXAMPLE 1

This referential example illustrates the process for the preparation of the liquid crystal polyester (a).

A reaction vessel equipped with a distillation tube and a stirrer was charged with 994.5 g (7.2 moles) of p-hydroxybenzoic acid (I), 125.7 g (0.675 mole) of 4,4'-dihydroxybiphenyl (II), 112.1 g (0.675 mole) of terephthalic acid, and 216.2 g (1.125 moles) of polyethylene terephthalate (III) having an intrinsic viscosity of about 0.6 and 960.2 g (9.4 moles) of acetic anhydride, and a polymerization involving removal of acetic acid, i.e., deacetylation polymerization was carried out under the following conditions.

First, a reaction was carried out at 130° to 150° C. for 4 hours in a nitrogen atmosphere. The amount of acetic acid distilled to this point was 48 g, which corresponded to 4.3% of the theoretical distilled amount. Then the temperature was elevated to 250° C. over a period of 2.5 hours and a reaction was conducted at 250° C. for 2.5 hours. The amount of the liquid distilled to this point was 900 g, which corresponded to 81% of the theoretical amount of the distillate. Furthermore, the temperature of the reaction temperature was elevated to 320° C., the pressure in the reaction vessel was reduced to 0.3 mmHg over a period of 1.5 hours, and a reaction was further conducted for 30 minutes to complete the polycondensation. The amount of acetic acid distilled t the point of the start of the reduction of the pressure was 980 g, which corresponded to 88% of the theoretical amount of the acetic acid distillate, and a polymer having a beige color was obtained by the above reaction.

The theoretical structural formula of this polymer was as shown below, and the results of the elementary analysis of the obtained polymer fully agreed with the theoretical values:

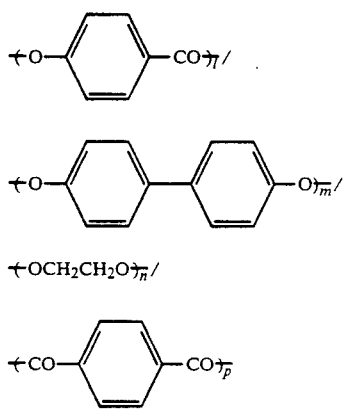

l/m/n/p = 80/7.5/12.5/20

The polyester was placed on a sample stage of a polarization microscope and the temperature was elevated to confirm the optical anisotropy. It was found that the liquid crystal-initiating temperature was 294° C., and that the polymer had a good optical anisotropy.

The melting point of this polymer was measured at a temperature-elevating rate of 20° C./min, using a Model DSC-7 supplied by Perkin-Elmer, and it was found that the peak temperature $Tm_1$ was 316° C. and the peak temperature $Tm_2$ was 312° C.

The logarithmic viscosity of the polymer was 1.70 dl/g and the melt viscosity of the polymer was 1,000 poise as measured at a temperature of 322° C. and a shear rate of 1,000 sec$^{-1}$, and thus, it was confirmed that the polymer had a very good flowability.

REFERENTIAL EXAMPLES 2 THROUGH 17

Liquid crystal polyesters (b) through (q) as the component (A) were prepared in the same manner as described in Referential Example 1 by using p-hydroxybenzoic acid (I), 4,4'-dihydroxybiphenyl (II-1), terephthalic acid (IV-1), polyethylene terephthalate (III-1), polyethylene terephthalate oligomer having a logarithmic viscosity of 0.18 dl/g (III-2), bis($\beta$-hydroxyethyl) terephthalate (III-3), hydroquinone (II-2), 2,6-dihydroxynaphthalene (2,6-diacetoxynaphthalene) (II-3), t-butylhydroquinone (II-4), 3,3',5,5'-tetramethyl-4,4'-dihydroxybiphenyl (II-5), phenylhydroquinone (II-6), 4,4'-dihydroxydiphenyl ether (II-7), 4,4'-diphenyldicarboxylic acid (IV-2), 2,6-naphthanedicarboxylic acid (IV-3), 4,4'-diphenyletherdicarboxylic acid (IV-4), 1,2-bis(phenoxy)ethane-4,4'-dicarboxylic acid (IV-5), and 1,2-bis(2-chlorophenoxy)ethane-4,4'-dicarboxylic acid (IV-6) at ratios shown in Table 1.

TABLE 1

| Referential Example No. | | (I) | (II-1) | (II-2) | (II-3) | (II-4) | (II-5) | (II-6) | (II-7) | (III-1) | (III-2) | (III-3) | (IV-1) | (IV-2) | (IV-3) | (IV-4) | (IV-5) | (IV-6) | Tm (Tm$_2$) (°C.) | Logarithmic viscosity (dl/g) |
|---|---|---|---|---|---|---|---|---|---|---|---|---|---|---|---|---|---|---|---|---|
| 2 | (b) | 80 | 7.5 | — | — | — | — | — | — | — | 12.5 | — | 7.5 | — | — | — | — | — | 312 | 1.64 |
| 3 | (c) | 80 | 7.5 | — | — | — | — | — | — | — | 7.5 | 2.5 | 10 | — | — | — | — | — | 315 | 1.72 |
| 4 | (d) | 80 | 6 | 1.5 | — | — | — | — | — | 12.5 | — | — | 7.5 | — | — | — | — | — | 313 | 1.81 |
| 5 | (e) | 80 | 6 | — | 1.5 | — | — | — | — | 12.5 | — | — | 7.5 | — | — | — | — | — | 310 | 1.90 |
| 6 | (f) | 80 | 6 | — | — | 1.5 | — | — | — | 12.5 | — | — | 7.5 | — | — | — | — | — | 308 | 1.63 |
| 7 | (g) | 80 | 6 | — | — | — | 1.5 | — | — | 12.5 | — | — | 7.5 | — | — | — | — | — | 304 | 1.60 |
| 8 | (h) | 80 | 6 | — | — | — | — | 1.5 | — | 12.5 | — | — | 7.5 | — | — | — | — | — | 310 | 1.77 |
| 9 | (i) | 80 | 6 | — | — | — | — | — | 1.5 | 12.5 | — | — | 7.5 | — | — | — | — | — | 304 | 1.64 |
| 10 | (j) | 80 | 7.5 | — | — | — | — | — | — | 12.5 | — | — | 6 | 1.5 | — | — | — | — | 311 | 1.95 |
| 11 | (k) | 80 | 7.5 | — | — | — | — | — | — | 12.5 | — | — | 6 | — | 1.5 | — | — | — | 309 | 2.07 |
| 12 | (l) | 80 | 7.5 | — | — | — | — | — | — | 12.5 | — | — | 6 | — | — | 1.5 | — | — | 309 | 2.00 |
| 13 | (m) | 80 | 7.5 | — | — | — | — | — | — | 12.5 | — | — | 6 | — | — | — | 1.5 | — | 309 | 1.80 |
| 14 | (n) | 80 | 7.5 | — | — | — | — | — | — | 12.5 | — | — | 6 | — | — | — | — | 1.5 | 308 | 1.86 |
| 15 | (p) | 77.5 | 7.5 | — | — | — | — | — | — | 15 | — | — | 7.5 | — | — | — | — | — | 291 | 1.56 |
| 16 | (q) | 82 | 8 | — | — | — | — | — | — | 10 | — | — | | | | | | | | |
| 17 | (r) | 50 | 10 | — | — | — | — | — | — | 40 | — | — | | | | | | | | |

TABLE 1-continued

| | | | | | | | | | |
|---|---|---|---|---|---|---|---|---|---|
| 16 | (q) | 8 | — | — | — | — | — | 326 | 1.85 |
| 17 | (r) | 10 | — | — | — | — | — | 203 | 0.89 |

REFERENTIAL EXAMPLE 18

A reaction vessel equipped with stirring vanes and a distillation tube was charged with 757 g (4.2 moles) of p-acetoxybenzoic acid and 538 g (2.8 moles) of polyethylene terephthalate having an intrinsic viscosity of about 0.6 dl/g, and diacetylation polymerization was carried out under the following conditions.

First, a reaction was carried out at 250° to 280° C. for 3 hours in a nitrogen gas atmosphere, the pressure was reduced to 1 mmHg, and the reaction mixture was heated for 5 hours to complete the polycondensation and obtain a resin (s) having the following theoretical structural formula:

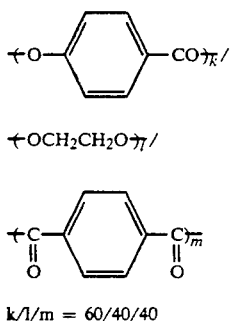

k/l/m = 60/40/40

The obtained polyester was placed on a sample stage of a polarization microscope, and the temperature was elevated to confirm the optical anisotropy. It was found that the liquid crystal-initiating temperature was 174° C. The melting points $Tm_1$ and $Tm_2$ of the polymers were 188° C. and 203° C., respectively. The logarithmic viscosity (measured under the same conditions as described in Referential Example 1) of the polyester was 0.65 dl/g.

REFERENTIAL EXAMPLE 19

A reaction vessel equipped with a stirrer and a distillation tube was charged with 1,440 g (8.0 moles) of p-acetoxybenzoic acid and 384 g (2.0 moles) of polyethylene terephthalate having an intrinsic viscosity of about 0.6 dl/g, and deacetylation polymerization was carried out under the following conditions.

First, a reaction was carried out at 250° to 300° C. for 3 hours in a nitrogen gas atmosphere, the pressure was reduced to 1 mmHg, and the reaction mixture was heated for 5 hours to complete polycondensation and obtain a resin (t) having the following theoretical structural formula:

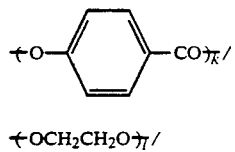

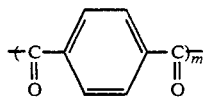

k/l/m = 80/20/20

The polyester was placed on a sample stage of a polarization microscope and the temperature was elevated to confirm the optical anisotropy. It was found that the liquid crystal-initiating temperature was 288° C. The melting points $Tm_1$ and $Tm_2$ of the polyester were 324° C. and 292° C., respectively. The logarithmic viscosity of the polyester was 0.63 dl/g (as determined under the same conditions as described in Referential Example 1).

REFERENTIAL EXAMPLE 20

A reaction vessel was charged with 833 g (6.03 moles) of p-hydroxybenzoic acid, 560 g (3.01 moles) of 4,4'-dihydroxybiphenyl, 500 g (3.01 moles) of terephthalic acid, 184 g (0.96 mole) of polyethylene terephthalate and 1,353 g (13.3 moles) of acetic anhydride, and the temperature was elevated to 150° C. over a period of 1 hour with stirring in a nitrogen gas atmosphere. At this temperature, the reaction mixture was refluxed for 3 hours, the temperature was elevated to 330° C. under high shearing while distilling and removing acetic acid formed by the reaction, and at this temperature, the reaction was conducted for a further 2 hours. Then the reaction mixture was cooled to 200° C., and the polymer taken out from the reaction vessel, pulverized, and subjected to the solid phase polymerization in a nitrogen gas current to obtain a polymer (u) having the following theoretical structural formula:

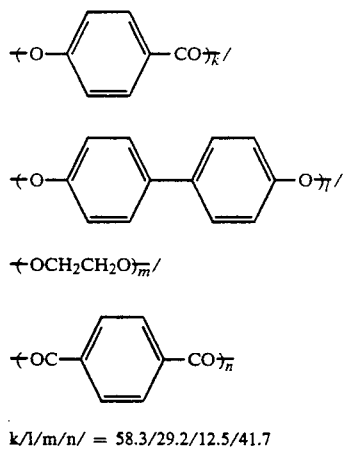

k/l/m/n/ = 58.3/29.2/12.5/41.7

The obtained polyester was placed on a sample stage of a polarization microscope and the temperature was elevated to confirm the optical anisotropy. Although the temperature was gradually elevated to 350° C., the liquid crystal phase could not be confirmed.

When the melting point of the polymer was measured at a temperature-elevating rate of 20° C./min using a Model DSC-7 supplied by Perkin-Elmer, an endothermic peak could not be detected at temperatures of up to 380° C., and accordingly, injection molding of the polymer was impossible.

EXAMPLE 1

By a ribbon blender, 100 parts by weight of the liquid crystal polyester (a) prepared in Referential Example 1 was dry-blended with 6 parts by weight of brominated polystyrene (Pyro-Chek 68PB supplied by Nissan Ferro; average particle diameter=50 μm, weight average molecular weight=$2.4 \times 10^5$), and the blend was melt-kneaded at a cylinder temperature of 310° C. by a twin-screw extruder having a screw diameter of 30 mm and then pelletized.

The obtained pellet was supplied to an injection molding machine (Sumitomo-Nestal Promat 40/25 supplied by Sumitomo Heavy Machine Industry) and molded at a cylinder temperature of 320° C. and a mold temperature of 90° C. to obtain bending test pieces ($\frac{1}{8}" \times \frac{1}{2} \times 5"$), test pieces ($\frac{1}{8}" \times \frac{1}{2} \times 5"$) for the measurement of the deflection temperature under a load of 18.6 kgf/cm² (HDT), and combustion test pieces (1/32"×$\frac{1}{2}$"×5" and $\frac{1}{8}$"×$\frac{1}{2}$"×5"). Using these test pieces, the deflection temperature under a load of 18.6 kgf/cm² and the flexural properties were measured, and the vertical combustion test was carried out according to UL-94 Standard. It was found that the deflection temperature under a load of 18.6 kgf/cm² was 232° C. and the flexural strength was 1,330 kgf/cm², and that the flame retardancy was V-0 at a thickness of 1/32".

From the scanning electron microscope (SEM) observation of the broken plane of the molded test piece and the transmission electron microscope (TEM) of the ultra-fine slice of the molded test piece, it was confirmed that the flame retardant was dispersed in the form of spheres having an average particle diameter of 1 μm.

EXAMPLE 2

A dry blend of 100 parts by weight of the polymer obtained in the same manner as described in Referential Example 1 with 6 parts by weight of brominated polystyrene (Pyro-Chek 68PB supplied by Nissan Ferro; average particle diameter=50 μm, weight average molecular weight=$2.4 \times 10^5$) and 45 parts by weight of a glass fiber (chopped strand having a length of 3 mm and an average filament diameter of 10 μm) was melt-kneaded and pelletized at 310° C. by a twin-screw extruder having a screw diameter of 30 mm.

The obtained pellet was molded to test pieces for the bending test and the measurement of the deflection temperature under a load of 18.6 kgf/cm² (HDT) and to combustion test pieces, under the same conditions as described in Example 1. Using these test pieces, the deflection temperature under load and the flexural properties were measured and the vertical combustion test was carried out according to the UL-94 Standard. It was found that the deflection temperature under a load of 18.6 kgf/cm² was 256° C., the flexural strength was 1,840 kgf/cm², and that the flame retardancy was V-0 at a thickness of 1/32".

When the broken plane of the molded test piece was observed by a scanning electron microscope (SEM), it was found that the flame retardant was dispersed in the form of spheres having an average particle diameter of about 1.2 μm.

EXAMPLES 3 THROUGH 24 AND COMPARATIVE EXAMPLES 1 THROUGH 6

The liquid polyesters (a) through (t) obtained in Referential Examples 1 through 19 were mixed with flame retardants and fillers at ratios shown in Table 2 by using a ribbon blender. The mixtures were melt-kneaded and pelletized in the same manner as described in Example 1, and the pellets were injection-molded and the evaluation carried out in the same manner as described in Example 1. The results are shown in Table 2.

TABLE 2

| Example No. | Liquid crystal polyester (A) Kind | Wt. parts | Polymeric flame retardant (B) Kind | Particle diameter (μm) | Molecular weight (Mw) | Wt. parts | Filler (C) Kind | Wt. parts | UL-94 flame retardancy 1/32" thickness | Flexural strength (kgf/cm²) | Av. dispersed particle diameter of flame retardant (μm) | HDT (°C.) |
|---|---|---|---|---|---|---|---|---|---|---|---|---|
| 3 | (a) | 100 | Br.-Ps*2 | 70 | 3.2 × 10⁵ | 6 | GF (10 μm) | 45 | V-0 | 1820 | 1.2 | 258 |
| 4 | (a) | 100 | " | 8 | 2.0 × 10⁵ | 6 | GF (10 μm) | 45 | V-0 | 1840 | 0.8 | 256 |
| 5 | (a) | 100 | " | 8 | 3.2 × 10⁵ | 6 | GF (10 μm) | 45 | V-0 | 1860 | 0.8 | 258 |
| 6 | (a) | 100 | " | 50 | 2.4 × 10⁵ | 6 | GF (13 μm) | 45 | V-0 | 1800 | 1.4 | 256 |
| 7 | (a) | 100 | " | 50 | 2.4 × 10⁵ | 6 | GF (6 μm) | 45 | V-0 | 1900 | 0.9 | 256 |
| 8 | (a) | 100 | Br.-PC*3 | — | 9.7 × 10³ | 7.5 | GF (10 μm) | 45 | V-0 | 1800 | 1.5 | 254 |
| 9 | (a) | 100 | Br.-PPO*4 | — | 6.0 × 10³ | 7.5 | GF (10 μm) | 45 | V-0 | 1780 | 1.3 | 256 |
| 10 | (b) | 100 | Br.-PS*2 | 50 | 2.4 × 10⁵ | 6 | GF (10 μm) | 45 | V-0 | 1840 | 1.1 | 256 |
| 11 | (c) | 100 | " | 50 | 2.4 × 10⁵ | 6 | GF (10 μm) | 45 | V-0 | 1830 | 1.1 | 252 |
| 12 | (d) | 100 | " | 50 | 2.4 × 10⁵ | 6 | GF (10 μm) | 45 | V-0 | 1770 | 1.6 | 250 |
| 13 | (e) | 100 | " | 50 | 2.4 × 10⁵ | 6 | GF (10 μm) | 45 | V-0 | 1820 | 1.0 | 256 |
| 14 | (f) | 100 | Br.-Ps*2 | 50 | 2.4 × 10⁵ | 6 | GF (10 μm) | 45 | V-0 | 1770 | 1.8 | 250 |
| 15 | (g) | 100 | " | 50 | 2.4 × 10⁵ | 6 | GF (10 μm) | 45 | V-0 | 1800 | 1.2 | 253 |

TABLE 2-continued

| | | | | | | | | | | | | |
|---|---|---|---|---|---|---|---|---|---|---|---|---|
| 16 | (h) | 100 | " | 50 | $2.4 \times 10^5$ | 6 | GF (10 μm) | 45 | V-0 | 1760 | 2.1 | 251 |
| 17 | (i) | 100 | " | 50 | $2.4 \times 10^5$ | 6 | GF (10 μm) | 45 | V-0 | 1820 | 1.3 | 252 |
| 18 | (j) | 100 | " | 50 | $2.4 \times 10^5$ | 6 | GF (10 μm) | 45 | V-0 | 1760 | 2.2 | 250 |
| 19 | (k) | 100 | " | 50 | $2.4 \times 10^5$ | 6 | GF (10 μm) | 45 | V-0 | 1810 | 1.4 | 249 |
| 20 | (l) | 100 | " | 50 | $2.4 \times 10^5$ | 6 | GF (10 μm) | 45 | V-0 | 1810 | 1.3 | 253 |
| 21 | (m) | 100 | " | 50 | $2.4 \times 10^5$ | 6 | GF (10 μm) | 45 | V-0 | 1800 | 1.6 | 251 |
| 22 | (n) | 100 | " | 50 | $2.4 \times 10^5$ | 6 | GF (10 μm) | 45 | V-0 | 1830 | 1.2 | 257 |
| 23 | (p) | 100 | " | 50 | $2.4 \times 10^5$ | 8 | GF (10 μm) | 45 | V-0 | 1790 | 1.3 | 238 |
| 24 | (q) | 100 | " | 50 | $2.4 \times 10^5$ | 6 | GF (10 μm) | 45 | V-0 | 1820 | 1.3 | 272 |

*[1] glass fiber
*[2] brominated polystyrene
*[3] brominated polycarbonate
*[4] brominated polyphenylene oxide

| Comparative Example No. | Composition | | | | | | | | UL-94 flame retardancy 1/32" thickness | Flexural strength (kgf/cm²) | Av. dispersed particle diameter of flame retardant (μm) | HDT (°C.) |
|---|---|---|---|---|---|---|---|---|---|---|---|---|
| | Liquid crystal polyester (A) | | Polymeric flame retardant (B) | | | | Filler (C) | | | | | |
| | Kind | Wt. parts | Kind | Particle diameter (μm) | Molecular weight (Mw) | Wt. parts | Kind | Wt. parts | | | | |
| 1 | (r) | 100 | Br.-Ps*[1] | 50 | $2.4 \times 10^5$ | 6 | GF*[2] (10 μm) | 45 | V-2 | 1580 | 3.8 | 130 |
| 2 | (s) | 100 | " | 50 | $2.4 \times 10^5$ | 6 | GF*[2] (10 μm) | 45 | V-2 | 1520 | 4.8 | 79 |
| 3 | (s) | 100 | " | 50 | $2.4 \times 10^5$ | 20 | GF*[2] (10 μm) | 45 | V-2 | 1470 | 5.8 | 79 |
| 4 | (t) | 100 | " | 50 | $2.4 \times 10^5$ | 10 | GF*[2] (10 μm) | 45 | V-0 | 1360 | 5.0 | 142 |
| 5 | (t) | 100 | " | 50 | $2.4 \times 10^5$ | 6 | GF*[2] (10 μm) | 45 | V-2 | 1390 | 4.6 | 144 |
| 6 | (a) | 100 | — | — | — | 0 | GF*[2] (10 μm) | 45 | V-2 | 1890 | — | 258 |

*[1] brominated polystyrene
*[2] glass fiber

EXAMPLE 25

Using a twin-screw extruder having a screw diameter of 30 mm, 100 parts by weight of the resin (a) obtained by the same method as described in Referential Example 1 was melt-mixed with 6 parts by weight of the same brominated polystyrene (Pyro-Chek 68PB supplied by Nissan-Ferro) as used in Example 2 at 310° C.

Using a twin-screw extruder having a screw diameter of 30 mm, 106 parts by weight of the obtained pellet was melt-mixed with 45 parts by weight of the same glass fiber as used in Example 2 at 320° C. and the mixture was pelletized.

The obtained pellet was supplied to an injection molding machine (Sumitomo-Nestal Promat 40/25 supplied by Sumitomo Heavy Machine Industry) and molded at a cylinder temperature of 320° C. and a mold temperature of 90° C. into combustion test pieces (1/32"×½"×5" and ⅛"×½"5") and test pieces for the bending test and for the measurement of the deflection temperature under a load of 18.6 kgf/cm² (⅛"×½"×5"). Using these test pieces, the deflection temperature under load (HDT) and the flexural properties were measured, and the vertical combustion test was carried out according to the UL 94 Standard.

As a result, it was found the polyester composition comprising the organic bromine compound according to the present invention had a flame retardancy of V-0 at a thickness of 1/32", an HDT of 258° C., and a flexural strength of 1,905 kgf/cm². It was confirmed that the polyester composition had a superior heat resistance and mechanical properties.

By a scanning electron microscope (SEM) observation of the broken plane of the molded test piece and a transmission electron microscope (TEM) observation of the ultra-fine slice of the molded test piece, it was confirmed that the flame retardant was dispersed in the form of spheres having an average particle diameter of 0.8 μm.

EXAMPLE 6

Using a twin-screw extruder having a screw diameter of 30 mm, 100 parts by weight of the resin (a) obtained by the same method as described in Referential Example 1 was melt-mixed with 6 parts by weight of the same brominated polystyrene (Pyro-Chek 68PB supplied by Nissan-Ferro) as used in Example 2 at 310° C.

Using a twin-screw extruder having a screw diameter of 30 mm, 36 parts by weight of the obtained pellet was melt-mixed with 70 parts by weight of the resin (a) and 45 parts by weight of the same glass fiber as used in Example 2 at 310° C. and the mixture was pelletized.

The obtained pellet was supplied to an injection molding machine (Sumitomo-Nestal Promat 40/25 supplied by Sumitomo Heavy Machine Industry) and molded at a cylinder temperature of 320° C. and a mold temperature of 90° C. into combustion test pieces (1/32"½"×5" and ⅛"×½"×5") and test pieces for the bending test and for the measurement of the deflection temperature under load (⅛"×½"5"). Using these test pieces, the deflection temperature under a load of 18.6 kgf/cm² (HDT) and the flexural properties were measured, and the vertical combustion test was carried out according to the UL 94 Standard.

As a result, it was found the polyester composition comprising the organic bromine compound according to the present invention had a flame retardancy of V-0 at a thickness of 1/32", an HDT of 257° C., and a flexural strength of 1,895 kgf/cm². It was confirmed that the polyester composition had a superior heat resistance and mechanical properties.

The above composition was molded after standing at 320° C. for 20 minutes in the molding machine, and the residence stability was examined. It was found that the flexural strength was 1,889 kgf/cm², and that no substantial degradation of the physical properties occurred.

By a scanning electron microscope (SEM) observation of the broken plane of the molded test piece and a transmission electron microscope (TEM) observation of the ultra-fine slice of the molded test piece, it was confirmed that the flame retardant was dispersed in the form of spheres having an average particle diameter of 1 μm.

EXAMPLE 27

In this example, the anisotropy of the injection-molded article was examined.

A pellet of a composition comprising the liquid crystal polyester (a) prepared in Referential Example 1, brominated polystyrene having an average particle diameter of 50 μm and a weight average molecular weight of about $2.4 \times 10^5$ as the polymeric flame retardant (B), and a glass fiber having an average filament diameter of 10 μm was molded into a square plate (side gate) of 70 mm×70 mm×2 mm at a cylinder temperature of 320° C. and a mold temperature of 90° C. by an injection molding machine (Sumitomo-Nestal Promat 40/25 supplied by Sumitomo Heavy Machine Industry).

Samples having a width of ½" were cut from the molded plate in the flow direction (MD) and the direction (TD) transverse to the flow direction, respectively, the bending test was carried out according to ASTM D-970, and the flexural modulus was measured. The flexural modulus in the MD direction was 132,000 kgf/cm², the flexural modulus in the TD direction was 38,000 kgf/cm², and the MD/TD ratio was 3.47.

By a scanning electron microscope (SEM) observation of the broken plane of the molded article, it was confirmed that the brominated polystyrene as the flame retardant was dispersed in the form of spheres having an average particle diameter of 1.0 μm.

EXAMPLE 28

By a ribbon blender, 100 parts by weight of the polymer (a) as the liquid crystal polyester (A) was dry-blended with 6 parts by weight of the same brominated polystyrene as used in Example 27, 45 parts by weight of the same glass fiber as used in Example 27 and 2 parts by weight of an epoxysilane compound (γ-glycidoxy-propyltrimethoxysilane), and the blend was melt-kneaded and pelletized at a cylinder temperature of 310° C. by using a twin-screw extruder having a screw diameter of 30 mm.

With respect to the obtained pellet, in the same manner as described in Example 27, the anisotropy was evaluated and the average dispersed particle diameter of the brominated polystyrene was measured. The results are shown in Table 3.

EXAMPLES 29 THROUGH 33 AND COMPARATIVE EXAMPLE 7

The polyesters (a) through (c) as the liquid crystal polyester (A) were melt-kneaded and pelletized with the same brominated polystyrene and glass fibers as used in Example 27 at mixing ratios shown in Table 3. In the same manner as described in Example 27, the pellets were injection-molded and the anisotropy and the average dispersed particle diameter of the brominated polystyrene were determined. The results are shown in Table 3.

In Comparative Example 7, wherein the brominated polystyrene was not added, the MD/TD ratio of the flexural modulus was 3.86, and therefore, it was confirmed that the brominated polystyrene was highly effective for improving the anisotropy characteristics.

TABLE 3

| Example No. | Composition | | | | | | Flexural modulus (kgf/cm²) | | Flexural modulus ratio (MD/TD) | Av. dispersed particle diameter of flame retardant (μm) |
|---|---|---|---|---|---|---|---|---|---|---|
| | Liquid crystal polyester (wt. parts) | Brominated polystyr (wt. parts) | Glass fiber Diameter (μm) | wt. parts | Epoxy compounds Kind* | wt. parts | MD direction | TD direction | | |
| 28 | 100 | 6 | 10 | 45 | a | 2' | 129,000 | 42,000 | 3.07 | 0.9 |
| 29 | 100 | 6 | 6 | 45 | a | 2 | 123,000 | 43,000 | 2.86 | 0.9 |
| 30 | 100 | 6 | 6 | 45 | — | 0 | 125,000 | 39,000 | 3.21 | 0.9 |
| 31 | 100 | 6 | 13 | 45 | — | 0 | 127,000 | 36,000 | 3.53 | 1.4 |
| 32 | 100 | 6 | 10 | 45 | b | 2 | 128,000 | 39,000 | 3.28 | 1.2 |
| 33 | 100 | 6 | 10 | 45 | c | 2 | 127,000 | 41,000 | 3.09 | 1.2 |
| Comp. Ex. | 100 | 0 | 10 | 45 | a | 2 | 129,500 | 33,500 | 3.86 | — |

TABLE 3-continued

| | Composition | | | | | Flexural modulus (kgf/cm²) | | Flexural modulus ratio (MD/TD) | Av. dispersed particle diameter of flame retardant (μm) |
|---|---|---|---|---|---|---|---|---|---|
| Liquid crystal polyester (wt. parts) | Brominated polystyr (wt. parts) | Glass fiber Diameter (μm) | wt. parts | Epoxy compounds Kind* | wt. parts | MD direction | TD direction | | |
| 7 | | | | | | | | | |

*Epoxy compounds a 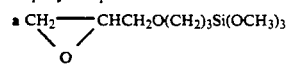

b 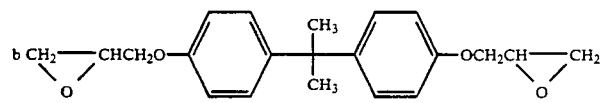

c 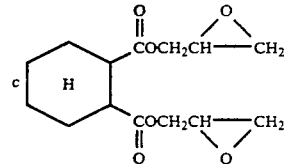

We claim:

1. A flame-retardant liquid crystal polyester composition which comprises (A) 100 parts by weight of a liquid crystal polyester comprising structural units represented by the following formulae (I), (II), (III) and (IV), in which the amount of structural units (I) and (II) is 77 to 95% by mole based on structural units (I), (II) and (III), the amount of structural units (III) is 23 to 5% by mole based on structural units (I), (II) and (III), and the structural units (I)/structural units (II) molar ratio is from 75/25 to 95/5, and (B) 0.5 to 30 parts by weight of a polymeric flame retardant having an average dispersed particle diameter not larger than 2.5 μm, wherein the aforementioned formulae are:

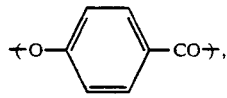 (I)

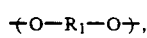 (II)

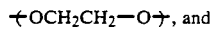 (III)

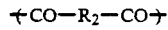 (IV)

wherein R₁ represents at least one group selected from the group consisting of

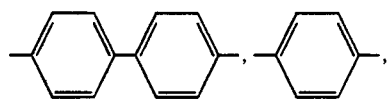

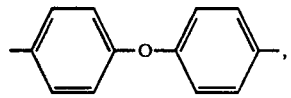

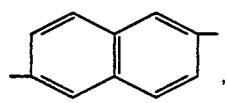

-continued

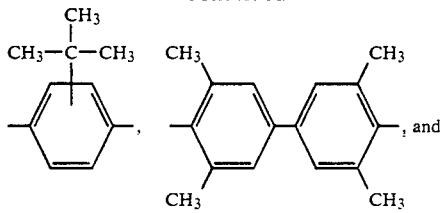, and

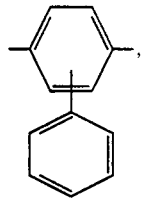

and R₃ represents at least one group selected from the group consisting of

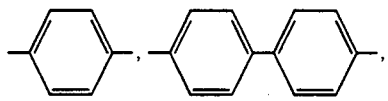

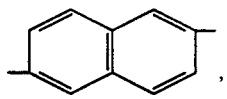

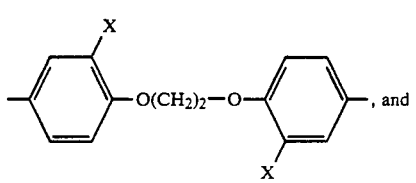, and

-continued

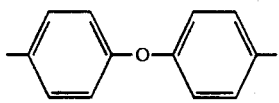

in which X represents a hydrogen atom or a chlorine atom, and the amount of structural units (IV) is substantially equimolar to the sum of the amounts of structural units (II) and (III); and said polymeric flame retardant (B) being at least one compound selected from the group consisting of (a) polymeric organic bromine compounds containing at least 20% by weight of bromine and (b) polymeric organic phosphorous compounds comprised of structural units represented by at least one of the following formula (i) through (iv):

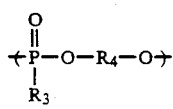 (i)

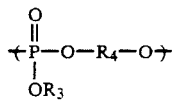 (ii)

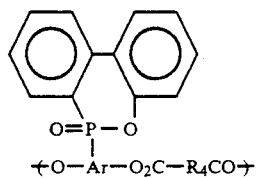 (iii)

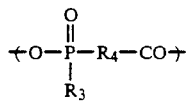 (iv)

wherein $R_1$ represents an alkyl group having 1 to 12 carbon atoms or an aryl group having 6 to 12 carbon atoms and $R_4$ represents an alkylene group having 1 to 15 carbon atoms, a cycloalkylene group having 3 to 15 carbon atoms or an arylene group having 6 to 15 carbon atoms.

2. A flame-retardant liquid crystal polyester composition according to claim 1, which further comprises (C) 1 to 200 parts by weight of a filler per 100 parts by weight of the sum of the liquid crystal polyester (A) and the polymeric flame retardant (B).

3. A flame-retardant liquid crystal polyester composition according to claim 1, wherein the average dispersed particle diameter of the polymeric flame retardant is not larger than 2.0 μm.

4. A flame-retardant liquid crystal polyester composition according to claim 1, wherein the average dispersed particle diameter is not larger than 1.5 μm.

5. A flame-retardant liquid crystal polyester composition according to claim 1, wherein the amount of structural units (I) and (II) is 80 to 93% by mole based on the sum of structural units (I), (II) and (III), the amount of structural units (III) is 20 to 7% by mole based on the sum of structural units (I), (II) and (III), and the structural units (I)/structural units (II) molar ratio is from 78/22 to 93/7.

6. A flame-retardant liquid crystal polyester composition according to claim 1, wherein the amount of structural units (I) and (II) is 80 to 93% by mole based on the sum of structural units (I), (II) and (III), the amount of structural units (III) is 20 to 7% by mole based on the sum of structural units (I), (II) and (III), and the structural units (I)/structural units (II) molar ratio is from 91/9 to 93/7.

7. A flame-retardant liquid crystal polyester composition according to claim 1, wherein $R_1$ in structural units (II) comprises at least 70% by mole of

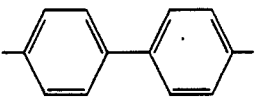

and $R_2$ in structural units (IV) comprises at least 70% by mole of

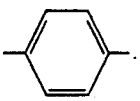

8. A flame-retardant liquid crystal polyester composition according to claim 1, wherein $R_1$ in structural units (II) is

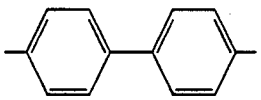

and $R_2$ in structural units (IV) is

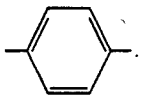

9. A flame-retardant liquid crystal polyester composition according to claim 1, wherein the melting point (Tm, °C.) of the liquid crystal polyester (A) satisfies the requirement represented by the following formula (1):

$$-10 < (Tm + 5.89X - 385.5) < 10 \quad (1)$$

wherein X represents the ratio (% by mole) of structural units (III) to the sum of structural units (I), (II) and (III).

10. A flame-retardant liquid crystal polyester composition according to claim 1, wherein the polymeric flame retardant (B) is brominated polystyrene.

11. A flame-retardant liquid crystal polyester composition as set forth in claim 10, wherein at least 70% by mole of recurring units of the brominated polystyrene are units of

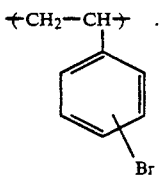

12. A flame-retardant liquid crystal polyester composition according to claim 10, wherein the weight average molecular weight of the brominated polystyrene is from $15\times10^4$ to $100\times10^4$.

13. A flame-retardant liquid crystal polyester composition according to claim 10, wherein the weight average molecular weight of the brominated polystyrene is $20\times10^4$ to $100\times10^4$.

14. A flame-retardant liquid crystal polyester composition according to claim 10, wherein the weight average molecular weight of the brominated polystyrene is $30\times10^4$ to $100\times10^4$.

15. A flame-retardant liquid crystal polyester composition according to claim 2, wherein the filler (C) is a glass fiber.

16. A flame-retardant liquid crystal polyester composition according to claim 15, wherein the average filament diameter of the glass fiber is 4 to 15 μm.

17. A flame-retardant liquid crystal polyester composition according to claim 15, wherein the average filament diameter of the glass fiber is 4 to 11 μm.

18. A flame-retardant liquid crystal polyester composition according to claim 1, which further comprises at least one compound selected from the group consisting of epoxy compounds and epoxysilane compounds in an amount of 0.01 to 20 parts by weight per 100 parts by weight of the liquid crystal polyester (A).

19. An injection-molded article which is formed by injection-molding a flame-retardant liquid crystal polyester composition comprising (A) 100 parts by weight of a liquid crystal polyester comprising structural units represented by the following formulae (I), (II), (III) and (IV), in which the amount of structural units (I) and (II) is 77 to 95% by mole based on structural units (I), (II) and (III), the amount of structural units (III) is 23 to 5% by mole based on structural units (I), (II) and (III), and the structural units (I)/structural units (II) molar ratio is from 75/25 to 95/5, and (B) 0.5 to 30 parts by weight of a polymeric flame retardant having an average dispersed particle diameter not larger than 2.5 μm, wherein the aforementioned formulae are:

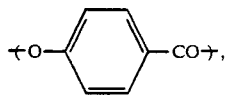 (I)

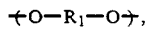 (II)

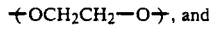 (III)

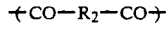 (IV)

wherein $R_1$ represents at least one group selected from the group consisting of

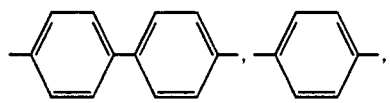

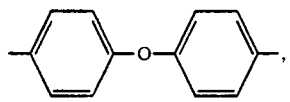

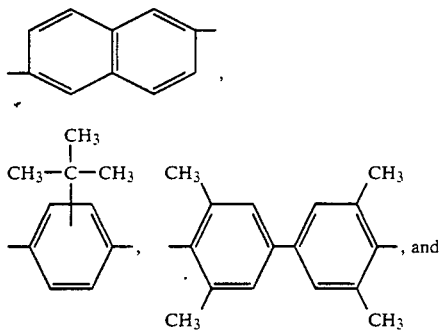, and

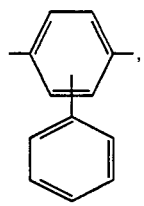

and $R_2$ represents at least one group selected from the group consisting of

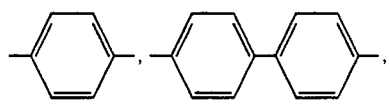

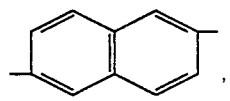

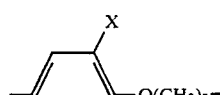, and

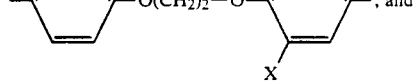

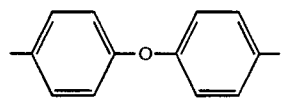

in which X represents a hydrogen atom or a chlorine atom, and the amount of structural units (IV) is substantially equimolar to the sum of the amounts of structural units (II) and (III); and said polymeric flame retardant (B) being at least one compound selected from the group consisting of (a) polymeric organic bromine compounds containing at least 20% by weight of bromine and (b) polymeric organic phosphorous compounds comprised of structural units represented by at least one of the following formula (i) through (iv):

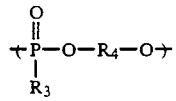 (i)

-continued

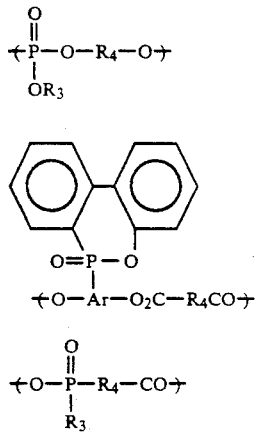

wherein R₃ represents an alkyl group having 1 to 12 carbon atoms or an aryl group having 6 to 12 carbon atoms and R₄ represents an alkylene group having 1 to 15 carbon atoms, a cycloalkylene group having 3 to 15 carbon atoms or an arylene group having 6 to 15 carbon atoms.

20. An injection-molded article according to claim 19, wherein the flame retardant liquid crystal polyester composition further comprises (C) a filler in an amount of 1 to 200 parts by weight per 100 parts by weight of the sum of the liquid polyester (A) and the polymeric flame retardant (B).

21. An injection-molded article according to claim 19, wherein R₁ in structural units (II) comprises at least 70% by mole of

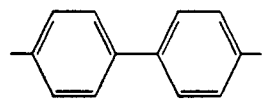

and R₂ in structural units (IV) comprises at least 70% by mole of

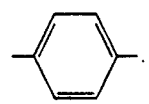

22. An injection-molded article as set forth in claim 20, wherein R₁ in structural units (II) comprises at least 70% by mole of

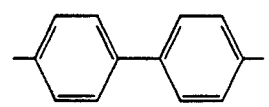

and R₂ in structural units (IV) comprises at least 70% by mole of

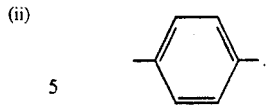

23. An injection-molded article according to claim 19, wherein the heat distortion temperature (HDT, °C.) satisfies the requirement represented by the following formula (2):

$$-20 < ([HDT] - 323 + 6.8X) < 20 \quad (2)$$

wherein X represents the ratio (% by mole) of structural units (III) to the sum of structural units (I), (II) and (III).

24. An injection-molded article according to claim 19, wherein the heat distortion temperature (HDT, °C.) satisfies the requirement represented by the following formula (2'):

$$-10 < ([HDT] - 323 + 6.8X) < 10 \quad (2')$$

wherein X represents the ratio (% by mole) of structural units (III) to the sum of structural units (I), (II) and (III).

25. An injection-molded article according to claim 20, wherein the heat distortion temperature (HDT, °C.) satisfies the requirement represented by the following formula (3):

$$-20 < ([HDT] - Z + 6.8X - 85) < 20 \quad (3)$$

wherein X represents the ratio (mole %) of structural units (III) to the sum of structural units (I), (II) and (III), and Z is a value defined by the following formula (4):

$$Z = -\frac{1}{90} y^2 + \frac{29}{30} y + 238 \quad (4)$$

in which y represents the ratio (% by weight) of the filler (C) in the composition to the sum of the filler (C) and the liquid crystal polyester (A).

26. An injection-molded article according to claim 20, wherein the heat distortion temperature (HDT, °C.) satisfies the requirement represented by the following formula (3'):

$$-10 < ([HDT] - Z + 6.8X - 85) < 10 \quad (3')$$

wherein X represents the ratio (mole %) of structural units (III) to the sum of structural units (I), (II) and (III), and Z is a value defined by the following formula (4):

$$Z = -\frac{1}{90} y^2 + \frac{29}{30} y + 238 \quad (4)$$

in which y represents the ratio (% by weight) of the filler (C) in the composition to the sum of the filler (C) and the liquid crystal polyester (A).

* * * * *

UNITED STATES PATENT AND TRADEMARK OFFICE
CERTIFICATE OF CORRECTION

PATENT NO. : 5,085,807
DATED : February 4, 1992
INVENTOR(S) : Masaru Okamoto et al It is certified that error appears in the above-identified patent and that said Letters Patent is hereby corrected as shown below:

Column 15, line 46, delete "30".

Column 19, line 57, after "$\frac{1}{2}$", second occurrence, insert --x--.

Column 20, line 51, please change "Example 6" to --Example 26--.

Column 21, line 2, after "$\frac{1}{2}$" insert --x--.

Column 24, line 49, please change "$R_3$" to --$R_2$--.

Column 25, line 41, please change "$R_1$" to --$R_3$--.

Signed and Sealed this

Fourth Day of May, 1993

MICHAEL K. KIRK

*Attest:*

*Attesting Officer*    Acting Commissioner of Patents and Trademarks

UNITED STATES PATENT AND TRADEMARK OFFICE
CERTIFICATE OF CORRECTION

PATENT NO. : 5,085,807
DATED : February 4, 1992
INVENTOR(S) : Masaru Okamoto et al It is certified that error appears in the above-identified patent and that said Letters Patent is hereby corrected as shown below:

In column 6 & 7, and Col. 26, line 67, please change "Br" to --$Br_3$--.

Signed and Sealed this

Twentieth Day of July, 1993

Attest:

MICHAEL K. KIRK

Attesting Officer

Acting Commissioner of Patents and Trademarks